(12) United States Patent
Maruyama et al.

(10) Patent No.: US 7,763,318 B2
(45) Date of Patent: Jul. 27, 2010

(54) METHOD FOR IMPROVING HEAT STABILITY OF POLYPARAXYLYLENE AND DERIVATIVE FILM THEREOF AND POLYPARAXYLYLENE DERIVATIVE

(75) Inventors: Hiroshi Maruyama, Chiba (JP); Tsutomu Mochizuki, Chiba (JP); Takashi Inoue, Chiba (JP)

(73) Assignee: Daisankasei Co., Ltd., Tokyo (JP)

( * ) Notice: Subject to any disclaimer, the term of this patent is extended or adjusted under 35 U.S.C. 154(b) by 1033 days.

(21) Appl. No.: 10/596,589

(22) PCT Filed: Dec. 19, 2003

(86) PCT No.: PCT/JP03/16371

§ 371 (c)(1), (2), (4) Date: Jul. 25, 2006

(87) PCT Pub. No.: WO2005/061576

PCT Pub. Date: Jul. 7, 2005

(65) Prior Publication Data

US 2007/0105997 A1 May 10, 2007

(51) Int. Cl.
C23C 16/00 (2006.01)

(52) U.S. Cl. .................................. 427/255.28

(58) Field of Classification Search ............ None
See application file for complete search history.

(56) References Cited

U.S. PATENT DOCUMENTS 3,268,599 A 8/1966 Chow (Continued)

FOREIGN PATENT DOCUMENTS

JP 5-255149 10/1993

(Continued)

OTHER PUBLICATIONS

Lahann et al, Novel Poly(p-xylylenes): Thin Films with Tailored Chemical and Optical Properties, Macromolecules 2002, 35, p. 4380-4386.*

(Continued)

*Primary Examiner*—Timothy H Meeks
*Assistant Examiner*—Elizabeth Burkhart
(74) *Attorney, Agent, or Firm*—K&L Gates LLP

(57) ABSTRACT

A method for improving the heat stability of polyparaxylylene and a derivative film thereof to improve the heat resistance of the polyparaxylylene and the derivative film thereof without deteriorating deposition characteristics or profitability, and a polyparaxylylene derivative whose heat resistance is improved are provided. When the polyparaxylylene or the derivative film thereof represented by a below-described general formula 1 is formed by a chemical vapor deposition method, an amino-(2.2)-paracyclophane compound represented by a below-described general formula 3 is mixed in a (2.2)-paracyclophane compound represented by a below-described general formula 2 to form a film.

General formula 1

(In the formula 1, $X_1$ and $X_2$ designate hydrogen, lower alkyl or halogen. $X_1$ and $X_2$ may be the same or different. n represents a degree of polymerization.)

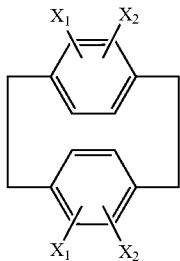

General formula 2

(In the formula 2, $X_1$ and $X_2$ have the same meanings as those of the formula 1.)

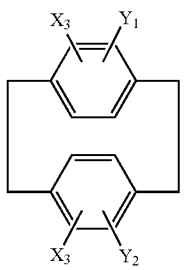

General formula 3

(In the formula 3, $X_3$ designates hydrogen or a lower alkyl group. $Y_1$ and $Y_2$ designate hydrogen or an amino group and both $Y_1$ and $Y_2$ are not hydrogens at the same time.)

6 Claims, 2 Drawing Sheets

U.S. PATENT DOCUMENTS

| | | |
|---|---|---|
| 3,274,267 A | 9/1966 | Chow |
| 3,297,591 A | 1/1967 | Chow |
| 4,176,209 A | 11/1979 | Baker et al. |
| 5,267,390 A | 12/1993 | Yang et al. |
| 5,270,082 A | 12/1993 | Lin et al. |
| 5,466,947 A | 11/1995 | Fleig et al. |

FOREIGN PATENT DOCUMENTS

| | | |
|---|---|---|
| JP | 6-145657 | 5/1994 |
| JP | 9-25252 | 1/1997 |
| JP | 9-71672 | 3/1997 |
| JP | 9-281500 | 10/1997 |
| JP | 10-195181 | 7/1998 |
| JP | 2000-216152 | 8/2000 |
| JP | 2001-213818 | 8/2001 |
| JP | 2001-226300 | 8/2001 |

OTHER PUBLICATIONS

Vaeth et al, Blue Electroluminescent Copolymers by Parylene-Based Chemical Vapor Deposition, Macromolecules 2000, 33, p. 5336-5339.*

Lahann; Klee; Hocker; "Chemical vapour deposition polymerization of substituted [2.2]paracyclophanes"; Macromolecular Rapid Communications 19, No. 9; 1998; pp. 441-444; Wiley-VCH Verlag GmbH, D-69451; Weinheim.

* cited by examiner

METHOD FOR IMPROVING HEAT STABILITY OF POLYPARAXYLYLENE AND DERIVATIVE FILM THEREOF AND POLYPARAXYLYLENE DERIVATIVE

BACKGROUND

The present invention relates to an improvement of heat resistance of a polyparaxylylene derivative formed from a (2.2)-paracyclophane compound by a chemical vapor deposition method.

When a (2.2)-paracyclophane compound expressed by a below-described general formula 2 is heated to 600 to 700° C., the compound is readily decomposed due to the feature of its structure as shown by a below-described reaction formula I to become a xylylene radical, which is polymerized on the surface of a substance to form a coating film composed of polyparaxylylene.

According to this coating method, a conformal coating can be applied to objects to be coated which have various kinds of configurations. Since the film formed by this method is excellent in its gas barrier characteristics, insulating characteristics or a chemical resistance, the film is widely employed for coating electronic parts, space or aircraft parts or medical devices therewith.

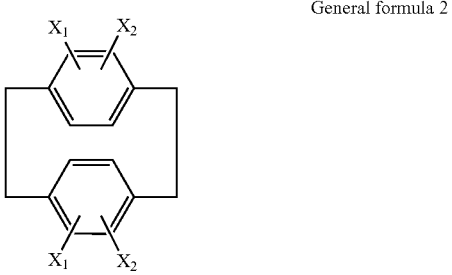

General formula 2

(In the formula 2, $X_1$ and $X_2$ represent hydrogen, lower alkyl or halogen. $X_1$ and $X_2$ may be the same or different.)

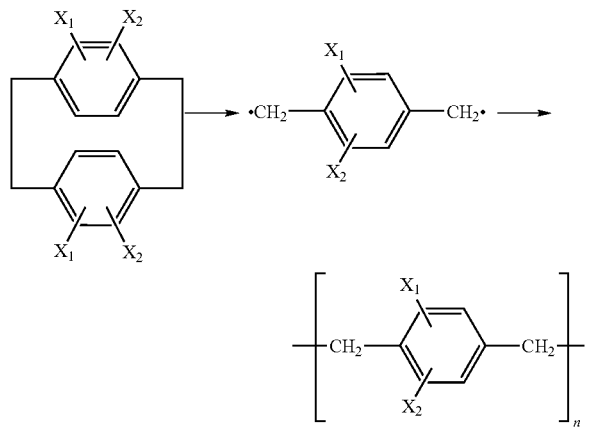

Reaction formula I

The (2.2)-paracyclophane compound that is currently industrially used as a film material includes (2.2)-paracyclophane (in the general formula 2, $X_1$ and $X_2$=hydrogen), dichloro-(2.2)-paracyclophane (in the general formula 2, $X_1$=hydrogen and $X_2$=chlorine) and tetrachloro-(2.2)-paracyclophane (in the general formula 2, $X_1$ and $X_2$=chlorine). From the (2.2)-paracyclophane, polyparaxylylene is produced. From the dichloro-(2.2)-paracyclophane, polymonochloroparaxylylene is produced. From the tetrachloro-(2.2)-paracyclophane, polydichloroparaxylylene is produced. In the formula, n designates a degree of polymerization.

As the rate of commercial use of these materials, the dichloro-(2.2)-paracyclophane occupies about 90% as much as the entire part in view of the physical properties of a polyparaxylylene film and the easiness of coating.

However, in the field of a semiconductor and electronic parts, a coating material is strongly apt to reject chlorine, and accordingly, a use of coating by employing the (2.2)-paracyclophane including no chlorine has been liable to increase. Further, a quantity of use of the tetrachloro-(2.2)-paracyclophane is extremely low owing to below-described reasons.

Though this coating film has the very excellent performances as described above, the film has one serious problem in its use. This problem results from a fact that a methylene group having a structure of —$CH_2$—$CH_2$— for connecting benzene nucleuses in a polyparaxylylene structure is ordinarily easily oxidized. Further, the oxidation is accelerated due to the rise of temperature.

Accordingly, the coating film can be used in a high temperature area under an environment having no oxygen such as in inert gas or vacuum, however, the coating film has a limitation in view of temperature in its use under an environment having oxygen.

In this case, a difference arises in a heat resistance depending on the kinds or the number of substituents. In this connection, the maximum working temperature of the polyparaxylylene film having no substituent is said to be 100° C. and the maximum working temperature of the polymonochloroparaxylylene film having one chlorine substituent in the benzene nucleus is said to be 120° C. On the other hand, the maximum working temperature of the polydichloroparaxylylene film having two chlorine substituents in the benzene nucleus is said to be 140° C. and has a considerably high heat resistance and the polydichloroparaxylylene is located at a high heat resistant grade in the polyparaxylylene film.

In fact, owing to this heat resistance, an attempt has been made that the tetrachloro-(2.2)-paracyclophane is used as a coating material of a ferrite core. However, since the polymerizing characteristics of a biradical produced by the thermal decomposition of the tetrachloro-(2.2)-paracyclophane are too strong and vapor thereof is heavy, the biradical is hardly diffused and is polymerized in the vicinity of an inlet of a coating chamber. Thus, the object to be coated with the coating material is hardly efficiently and uniformly coated with the polydichloroparaxylylene film. Therefore, at present, such an investigation has not been made. Only a small quantity of these materials is employed for a special use.

Various attempts for improving the heat resistance of the polyparaxylylene film have been made as shown in, for instance, U.S. Pat. Nos. 4,176,209, 5,267,390 and 5,270,082, and an attempt is proposed that an antioxidant is mixed with paracyclophane and the mixture is used to form a film.

However, techniques disclosed in these documents do not adequately solve the problem, and further, may possibly deteriorate film characteristics.

On the other hand, octafluoro-(2.2)-paracyclophane having a structure shown in a below-described formula 5 that all hydrogens of four methylene groups of (2.2)-paracyclophane are replaced by fluorines is used as the coating material.

Formula 5

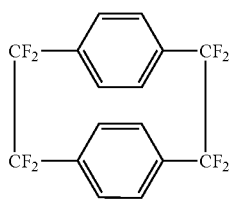

A polytetrafluoroparaxylylene film (formula 6) shown by a below-described formula 6 that is produced by a chemical vapor deposition of the coating material has been known to have an excellent heat resistance. As for a method for producing the compound (formula 6), some examinations have been made as shown in, for instance U.S. Pat. Nos. 3,268,599, 3,274,267, 3,297,591, Japanese Patent Application Laid-Open No. hei 5-255149, Japanese Patent Application Laid-Open No. 2001-213818 and Japanese Patent Application Laid-Open No. 2001-226300.

Formula 6

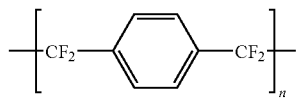

(in the formula, n represents a degree of polymerization.)

Further, the inventors of the present invention clarified that a poly-α, α-difluoroparaxylylene film (shown by a below-described formula 8) that is produced by chemical vapor deposition using tetrafluoro-(2.2)-paracyclophane (shown in a below-described formula 7 that is produced by replacing hydrogens of two methylene groups of four methylene groups of (2.2)-paracyclophane located in a diagonal line by fluorines) as the coating material had the excellent heat resistance (Japanese Patent Application Laid-Open No. hei 9-25252 and Japanese Patent Application Laid-Open No. hei 10-195181).

Formula 7

Formula 8

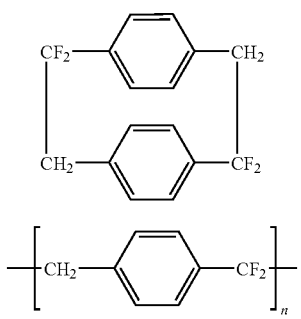

(In the formula, n represents a degree of polymerization.)

However, since the two coating materials need a fluorination process during producing the coating materials, a production cost cannot be avoided from increasing. Further, since the polymerization speed of a biradical produced in a thermal decomposition during a polymerization is very low, a special operation is required such as cooling an object to be coated with the coating material to accelerate the polymerization.

Accordingly, under these circumstances, the coating materials are hardly used for coating an inexpensive generalized product.

SUMMARY

In order to more increase an applied range of polyparaxylylene and a derivative film thereof, a working temperature range thereof needs to be enlarged. Further, this solving means shall not injure an easiness of coating and shall not seriously deteriorate profitability.

It is an object of the present invention to provide a method for improving a heat resistance of a film of polyparaxylylene and derivative thereof in which the heat resistance of the polyparaxylylene and the derivative film thereof can be improved without deteriorating deposition characteristics and causing a problem of profitability, and polyparaxylylene derivative whose heat resistance is improved.

The inventors of the present invention studied for the purpose of enlarging the working temperature range of the polyparaxylylene and the derivative film thereof without performing a special depositing operation and greatly increasing the cost of a coating material.

As a result of various examinations, the inventors of the present invention found that when polyparaxylylene and a derivative film thereof were produced, an amino-(2.2)-paracyclophane compound was mixed in a (2.2)-paracyclophane compound as a film forming material to form a film so that the heat resistance of the produced polyparaxylylene and the derivative film thereof were improved.

Specifically, the above-described object is achieved by a below-described structure of the present invention.

(1) A method for improving the heat stability of polyparaxylylene and a derivative film thereof in which when the polyparaxylylene or the derivative film thereof represented by a below-described general formula 1 is formed by a chemical vapor deposition method, an amino-(2.2)-paracyclophane compound represented by a below-described general formula 3 is mixed in a (2.2)-paracyclophane compound represented by a below-described general formula 2 to form a film.

General formula 1

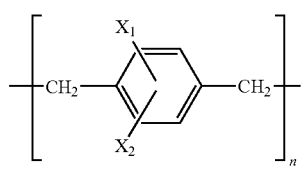

(In the formula 1, $X_1$ and $X_2$ designate hydrogen, lower alkyl or halogen. $X_1$ and $X_2$ may be the same or different. n represents a degree of polymerization.)

General formula 2

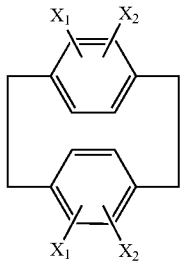

(In the formula 2, $X_1$ and $X_2$ have the same meanings as those of the formula 1.)

General formula 3

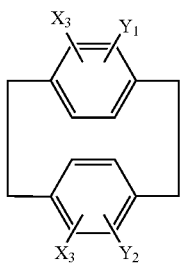

(In the formula 3, $X_3$ designates hydrogen or a lower alkyl group. $Y_1$ and $Y_2$ designate hydrogen or an amino group and both $Y_1$ and $Y_2$ are not hydrogens at the same time.)

(2) The method for improving the heat stability of polyparaxylylene and a derivative film thereof according to the above-described (1), wherein the polyparaxylylene and the derivative film thereof is a film of polyparaxylylene (in the general formula 1, $X_1$ and $X_2$=hydrogen), polymonochloroparaxylylene (in the general formula 1, $X_1$=hydrogen and $X_2$=chlorine) or polydichloroparaxylylene (in the general formula 1, $X_1$ and $X_2$=chlorine).

(3) The method for improving the heat stability of polyparaxylylene and a derivative film thereof according to the above-described (1) or (2), wherein the amino-(2.2)-paracyclophane compound is a monoamino-(2.2)-paracyclophane (in the general formula 3, $Y_1$=hydrogen and $Y_2$=amino group) or a diamino-(2.2)-paracyclophane (in the general formula 3, $Y_1$ and $Y_2$=amino group).

(4) A polyparaxylylene derivative represented by a below-described general formula 4.

General formula 4

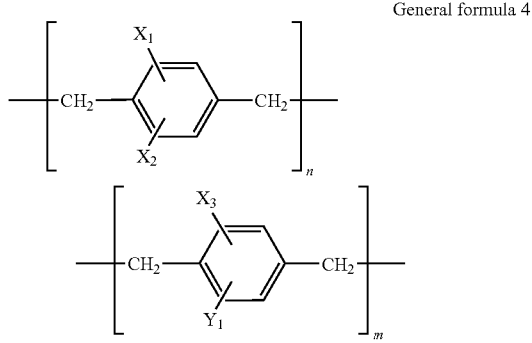

-continued

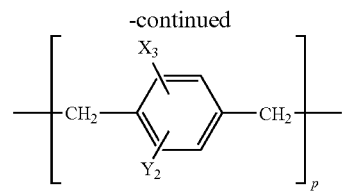

(In the formula 4, $X_1$ and $X_2$ designate hydrogen, lower alkyl or halogen. $X_1$ and $X_2$ may be the same or different. $X_3$ designates hydrogen or a lower alkyl group. $Y_1$ and $Y_2$ designate hydrogen or an amino group and both $Y_1$ and $Y_2$ are not hydrogens at the same time. n, m and p designate a degree of polymerization.)

(5) The polyparaxylylene derivative according to the above-described (4), wherein a thin film is formed.

Additional features and advantages of the present invention are described in, and will be apparent from, the following Detailed Description and the Figures.

DETAILED DESCRIPTION

Figure 1:
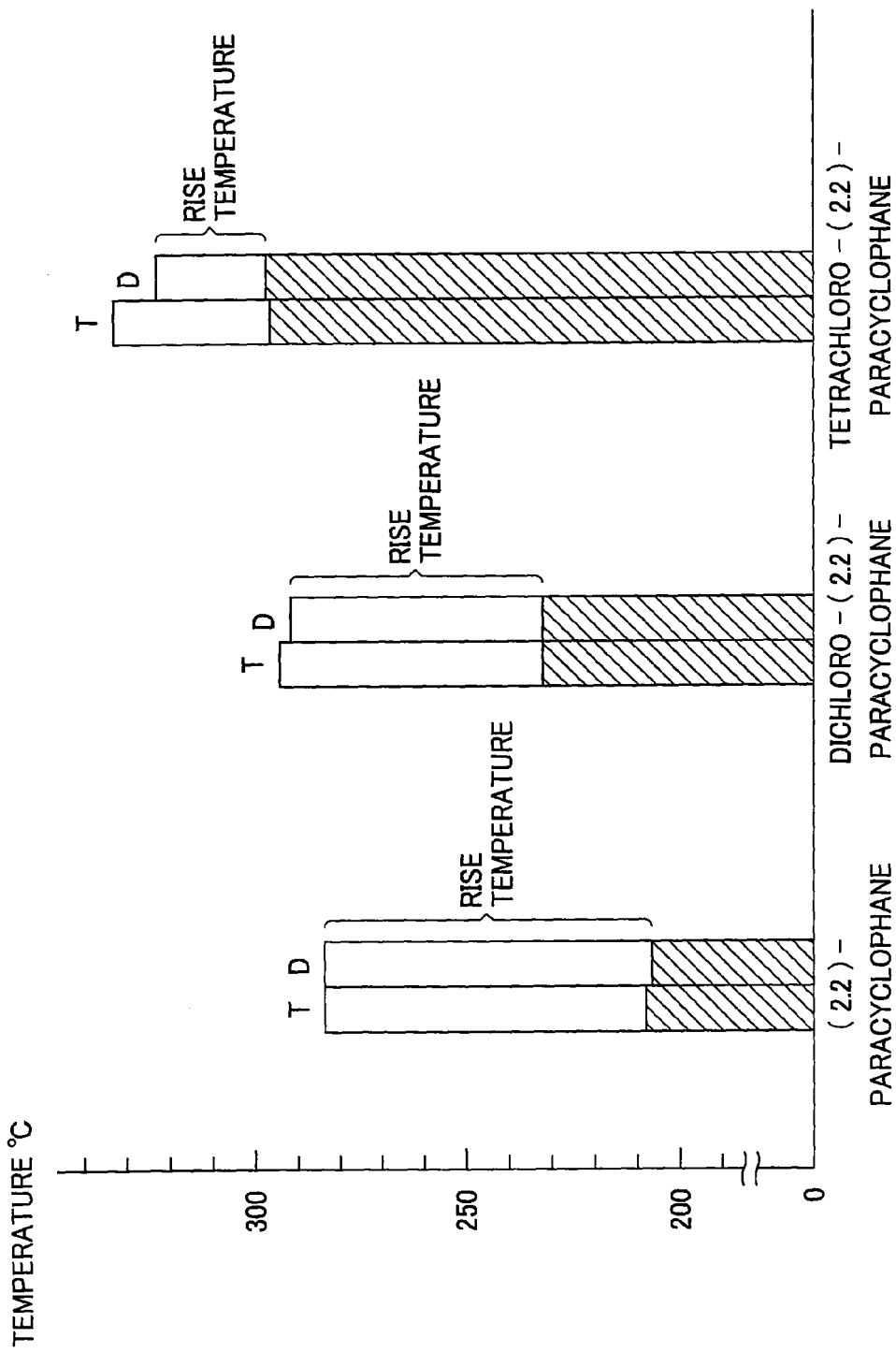
FIG. 1 is a graph showing the rise of a point T (temperature showing the start of the change of weight in a thermogravimetric analysis) by the mixture of amino-paracyclophane and a point D (rise temperature of a first peak by a heat generation in a differential thermal analysis) in materials respectively shown in examples. Oblique line parts of each bar graph show the temperatures of the point T and the point D when a film is formed only by a (2.2)-paracyclophane compound. White color parts show the rise temperatures of the point T and the point D when a monoamino-(2.2)-paracyclophane is mixed with the (2.2)-paracyclophane to form a film.

According to the present invention, in a method for improving the heat stability of polyparaxylylene and a derivative film thereof and a method for producing a polyparaxylylene derivative film whose heat stability is improved, when the polyparaxylylene or the derivative film thereof represented by a below-described general formula 1 is formed by a chemical vapor deposition method, an amino-(2.2)-paracyclophane compound represented by a below-described general formula 3 is mixed in a (2.2)-paracyclophane compound represented by a below-described general formula 2 to form a film.

General formula 1

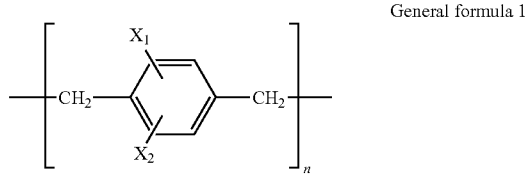

(In the formula 1, $X_1$ and $X_2$ designated hydrogen, lower alkyl or halogen. $X_1$ and $X_2$ may be the same or different. n represents a degree of polymerization.)

General formula 2

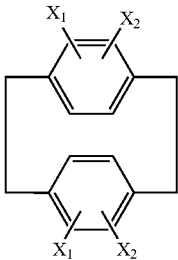

(In the formula 2, $X_1$ and $X_2$ have the same meanings as those of the formula 1.)

General formula 3

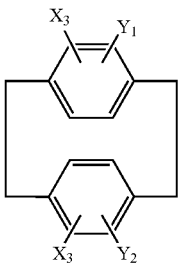

(In the formula 3, $X_3$ designates hydrogen or a lower alkyl group. $Y_1$ and $Y_2$ designate hydrogen or an amino group and both $Y_1$ and $Y_2$ are not hydrogens at the same time.)

In such a way, the amino-(2.2)-paracyclophane compound is mixed with the (2.2)-paracyclophane compound to form the film so that heat characteristics of a thin film thus formed can be extremely improved.

A heat resistance was evaluated by a thermogravimetric analysis and a differential thermal analysis and observing the states of the polyparaxylylene and the derivative film in a heating furnace.

The polyparaxylylene and the derivative film thereof include two kinds that the weight is increased due to an oxidation when temperature is raised in the thermogravimetric analysis, and then, the weight is decreased and that a phenomenon of the increase of weight does not arise and the weight is decreased. A polyparaxylylene film and a polymonochloroparaxylylene film belong to the former. A polydichloroparaxylylene film belongs to the latter. The changes of states may serve as indexes for comparing the heat resistance.

When the change of the weight is generated at the time of the thermogravimetric analysis, the generation of heat is found substantially at the same time in the differential thermal analysis.

As the index for comparing the heat resistance of the polyparaxylylene and the derivative film thereof, temperature at the start of the change of the weight (refer it to as a point T, hereinafter) was used in the thermogravimetric analysis. In the differential thermal analysis, the rise temperature of a first peak due to generated heat (refer it to as a point D, hereinafter) and the comparison of the states of a film when the film is heated in the heating furnace were employed. In the present invention, it was recognized that in any of these evaluation items, outstanding effects were seen and any of the above-described materials had effects.

Now, the above-described general formula 1 is described below. In the formula 1, $X_1$ and $X_2$ designate any of hydrogen, lower alkyl or halogen. $X_1$ and $X_2$ may be the same or different.

The polyparaxylylene or the derivative film thereof represented by the general formula 1 are preferably a film of polyparaxylylene (in the general formula 1, $X_1$ and $X_2$=hydrogen), polymonochloroparaxylylene (in the general formula 1, $X_1$=hydrogen and $X_2$=chlorine) or polydichloroparaxylylene (in the general formula 1, $X_1$ and $X_2$=chlorine).

As the material, the (2.2)-paracyclophane compound represented by the above-described general formula 2 is used. In the formula 2, $X_1$ and $X_2$ have the same meanings as those of the formula 1.

The amino-(2.2)-paracyclophane compound used for improving the heat stability is represented by the above-described general formula 3. In the formula 3, $X_3$ designates hydrogen or a lower alkyl group. $Y_1$ and $Y_2$ designate hydrogen or an amino group and both $Y_1$ and $Y_2$ are not hydrogens at the same time.

As the amino-(2.2)-paracyclophane compound, exemplified are, as representatives, a monoamino-(2.2)-paracyclophane (in the general formula 3, $Y_1$=hydrogen and $Y_2$=amino group) and a diamino-(2.2)-paracyclophane (in the general formula 3, $Y_1$ and $Y_2$=amino group).

Even when a quantity of mixing the amino-(2.2)-paracyclophane compound is small, the effect is obtained, however, a degree of the effect is low. On the other hand, when the quantity of mixing the amino-(2.2)-paracyclophane compound is increased, the effect is not necessarily the more increased. The effect reaches a limit at a certain point. Further, when only the amino-(2.2)-paracyclophane compound is employed, the film obtained therefrom does not show the excellent heat resistance. As an ordinarily used quantity, in the case of the monoamino-paracyclophane, 0.5 to 20%, preferably, 1 to 10% relative to the material in a mass ratio is employed. Further, when the quantity of use of the amino-(2.2)-paracyclophane compound is more decreased, profitability is the more increased.

As a mixing method, both the paracyclophane compounds may be simply mixed together in a powdered state, and, desirably mixed in a homogeneous state as much as possible.

As film forming conditions, the same deposition program as that when film materials are respectively individually used is employed to form the film. A reason or a mechanism why the amino-(2.2)-paracyclophane compound has the effect to improve the heat resistance of the polyparaxylylene and the derivative film thereof is not apparent at present.

Here, some documents disclose a method for producing the monoamino-(2.2)-paracyclophane to be used or the diamino-(2.2)-paracyclophane. As for the monoamino-(2.2)-paracyclophane, the inventors of the present invention found that a method in which the (2.2)-paracyclophane was nitrated by the mixed acid of methane sulfonic acid and fuming nitric acid in a methylene solvent and the obtained mononitro-(2.2)-paracyclophane was reduced by using iron-hydrochloric acid was an excellent method in view of yield and operation. The diamino-(2.2)-paracyclophane can be also produced by the same method.

According to a coating method using the product of the present invention, a conformal coating can be applied to objects to be coated which have various kinds of configurations. Since the film formed by this method is excellent in its gas barrier characteristics, insulating characteristics and a chemical resistance, the film can be widely employed for coating electronic parts, space or aircraft parts or medical devices therewith.

The polyparaxylylene derivative produced as described above is represented by a below-described general formula 4.

General formula 4

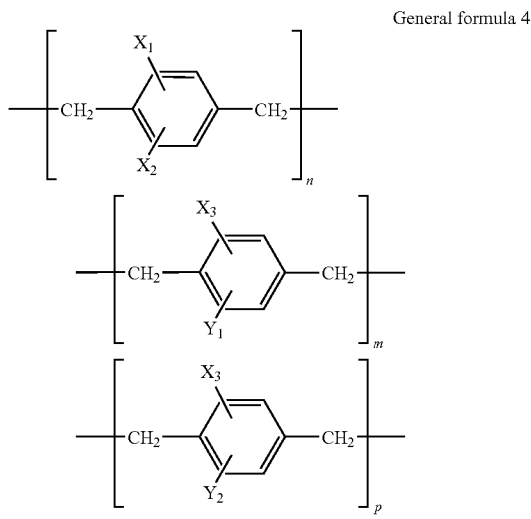

(In the formula 4, $X_1$ and $X_2$ designate hydrogen, lower alkyl or halogen. $X_1$ and $X_2$ may be the same or different. $X_3$ designates hydrogen or a lower alkyl group. $Y_1$ and $Y_2$ designate hydrogen or an amino group and both $Y_1$ and $Y_2$ are not hydrogens at the same time. n, m and p designate the degrees of polymerization of respective units. In the units respectively, substituents respectively represented by $X_1$, $X_2$ and $Y_1$ and $Y_2$ may be different or a plurality of different substituents may be present in each unit.)

The obtained polyparaxylylene derivative is classified into a copolymer, ordinarily to a random copolymer and forms a thin film. The thickness of the thin film is ordinarily 0.1 to 20 μm, and specially, about 0.5 to 10 μm.

EXAMPLES

Now, examples will be described below together with reference examples and the results of a heat resistance test of the film formed by the method of the present invention will be shown below. The present invention is not limited to these examples. As long as there is no special mention, "%" and "parts" in the below-described reference examples and the examples are based on "mass".

Reference Example 1

Synthesis of monoamino-(2.2)-paracyclophane

The (2.2)-paracyclophane of 8 g was suspended in methylene chloride of 200 ml. Mixed acid including methane sulfonic acid of 8 g and fuming nitric acid (d=1.52) of 5 g was dropped to the obtained solution while reaction solution was maintained at 5° C. or lower. After the dropping operation was completed, the solution was stirred for 30 minutes, and then, water of 200 ml was added to the solution. After a water layer was separated, a methylene chloride layer was distilled by steam to remove the methylene chloride.

A deposited reaction material was dissolved in toluene solution. The toluene solution was washed by 5% caustic soda aqueous solution of 50 ml three times. Then, the solution was washed until washing liquid became neutral. By the above-described operations, the toluene solution of mononitro-(2.2)-paracyclophane was obtained.

The toluene solution was concentrated to 40 g and reduced iron of 6 g, ethanol of 48 ml and water of 12 ml were added to the solution to heat and reflux the solution. While the solution was heated and refluxed, solution including concentrated hydrochloric acid of 6 ml, ethanol of 12 ml and water 12 ml was dropped onto the heated and refluxed solution. A reaction was completed when a nitro material reached 1% or less as much as an amino material in a gas chromatography analysis.

Water of 200 ml was added to the reaction solution and the solution was filtered to remove an insoluble material. A toluene layer was separated from a water layer. The amino-(2.2)-paracyclophane was extracted from the toluene solution by dilute hydrochloric acid. The hydrochloric acid solution was neutralized by caustic soda aqueous solution to precipitate the amino-(2.2)-paracyclophane. The precipitate was filtered, washed and dried to obtain rough amino-(2.2)-paracyclophane of 4.6 g.

The rough crystal of 4.6 g was sublimed and the sublimate was heated and refluxed together with methanol. Further, the methanol solution was concentrated and the concentrated solution was cooled in a freezer. After that, the concentrated solution was filtered and dried to obtain the amino-(2.2)-paracyclophane of 4.1 g.

Reference Example 2

Synthesis of diamino-(2.2)-paracyclophane

Synthesis of dinitro-(2.2)-paracyclophane

The (2.2)-paracyclophane of 48 g was suspended in methylene chloride of 200 ml. Mixed acid including methane sulfonic acid of 104 g and fuming nitric acid (d=1.50) of 65 g was dropped to the obtained solution while reaction solution was maintained at 5° C. or lower. After the dropping operation was completed, the solution was stirred until the next morning (about for 16 hours). Water of 300 ml was added to the reaction solution and caustic soda aqueous solution was further added to neutralize the reaction solution. After a water layer was separated, a methylene chloride layer was distilled by steam to remove the methylene chloride.

A deposited reaction material was dissolved in toluene solution. The toluene solution was washed by caustic soda aqueous solution. After the washing operation, the toluene solution was concentrated until the toluene solution of 33 g was obtained. The concentrated solution was cooled in a freezer, filtered, and washed by methanol to obtain dinitro-(2.2)-paracyclophane of 7.4 g. Further, the dinitro-(2.2)-paracyclophane of 1.6 g was recovered from the filtered solution to obtain a total of 9 g of the dinitro-(2.2)-paracyclophane.

Synthesis of diamino-(2.2)-paracyclophane

Solution including the dinitro-(2.2)-paracyclophane of 16.9 g obtained as described above, toluene of 100 g, reduced iron of 30 g, ethanol of 210 g and water of 52 ml was heated and refluxed. While the solution was heated and refluxed, solution including concentrated hydrochloric acid of 30 ml, ethanol of 60 ml and water 60 ml was dropped onto the heated and refluxed solution. A reaction was completed when a nitro material reached 1% or less as much as an amino material in a gas chromatography analysis.

The reaction solution was filtered to remove an insoluble material. Water of 300 ml was added to the filtered solution and stirred. After a water layer was separated, the toluene solution was concentrated to 39 g and the concentrated solution was cooled in a freezer.

The cooled solution was filtered, washed by methanol and dried to obtain diamino-(2.2)-paracyclophane of 7.2 g. Further, the diamino-(2.2)-paracyclophane of 2.4 g was recovered from the filtered solution to obtain a total of 9.6 g of the diamino-(2.2)-paracyclophane. The obtained diamino-(2.2)-paracyclophane was sublimed and purified to obtain purified diamino-(2.2)-paracyclophane of 7.5 g.

Example 1

A sample was produced by mixing the (2.2)-paracyclophane of 95 parts with the monoamino-(2.2)-paracyclophane of 5 parts. This sample was used to form a film by an ordinary deposition program employed for depositing the (2.2)-paracyclophane.

A heat resistance was evaluated by a thermogravimetric analysis and a differential thermal analysis and observing the states of the polyparaxylylene and the derivative film in a heating furnace.

As an index for comparing the heat resistance of the polyparaxylylene film, temperature at the start of the change of the weight (refer it to as a point T, hereinafter) was used in the thermogravimetric analysis. In the differential thermal analysis, the rise temperature of a first peak due to generated heat (refer it to as a point D, hereinafter) and the comparison of the states of a film when the film was heated in the heating furnace were employed.

The point T was 282.7° C. and the point D was 282.7° C. in the thermal analysis of the film.

Example 2

A sample was produced by mixing the dichloro-(2.2)-paracyclophane of 99 parts with the monoamino-(2.2)-paracyclophane of 1 part. This sample was used to form a film by an ordinary deposition program employed for depositing the dichloro-(2.2)-paracyclophane. The point T was 265.3° C. and the point D was 267.3° C. in the thermal analysis of the film.

Example 3

A sample was produced by mixing the dichloro-(2.2)-paracyclophane of 95 parts with the monoamino-(2.2)-paracyclophane of 5 parts. This sample was used to form a film in the same manner as that of the Example 2. The point T was 292.9° C. and the point D was 291.1° C. in the thermal analysis of the film. Further, when the film was heated to 200° C. in an electric furnace and a state at this time was compared with a film obtained when the amino-(2.2)-paracyclophane compound was not mixed, the improvement of the heat resistance was recognized. A comparison is shown in table 2.

Example 4

A sample was produced by mixing the dichloro-(2.2)-paracyclophane of 90 parts with the monoamino-(2.2)-paracyclophane of 10 parts. This sample was used to form a film in the same manner as that of the Example 2. The point T was 296.4° C. and the point D was 295.4° C. in the thermal analysis of the film.

Example 5

A sample was produced by mixing tetrachloro-(2.2)-paracyclophane of 95 parts with the monoamino-(2.2)-paracyclophane of 5 parts. This sample was used to form a film on a silicon wafer by an ordinary deposition program employed for depositing the tetrachloro-(2.2)-paracyclophane. The point T was 330.6° C. and the point D was 320.4° C. in the thermal analysis of the film.

Example 6

A sample was produced by mixing the dichloro-(2.2)-paracyclophane of 97.5 parts with diamino-(2.2)-paracyclophane of 2.5 parts. This sample was used to form a film in the same manner as that of the Example 2. The point T was 291.1° C. and the point D was 288.9° C. in the thermal analysis of the film.

Comparative Example 1

The (2.2)-paracyclophane was used to form a film by an ordinary deposition program. The point T was 206.5° C. and the point D was 205.4° C. in the thermal analysis of the film.

Comparative Example 2

The dichloro-(2.2)-paracyclophane was used to form a film by an ordinary deposition program. The point T was 232.3° C. and the point D was 232.3° C. in the thermal analysis of the film.

Comparative Example 3

The tetrachloro-(2.2)-paracyclophane was used to form a film by an ordinary program. The point T was 294.8° C. and the point D was 295.8° C. in the thermal analysis of the film.

The results shown by the Examples of the present invention were summarized in the following tables and drawings.

Table 1, FIG. 1: effect of 5% mixture for a point T and a point D

Figure 2:
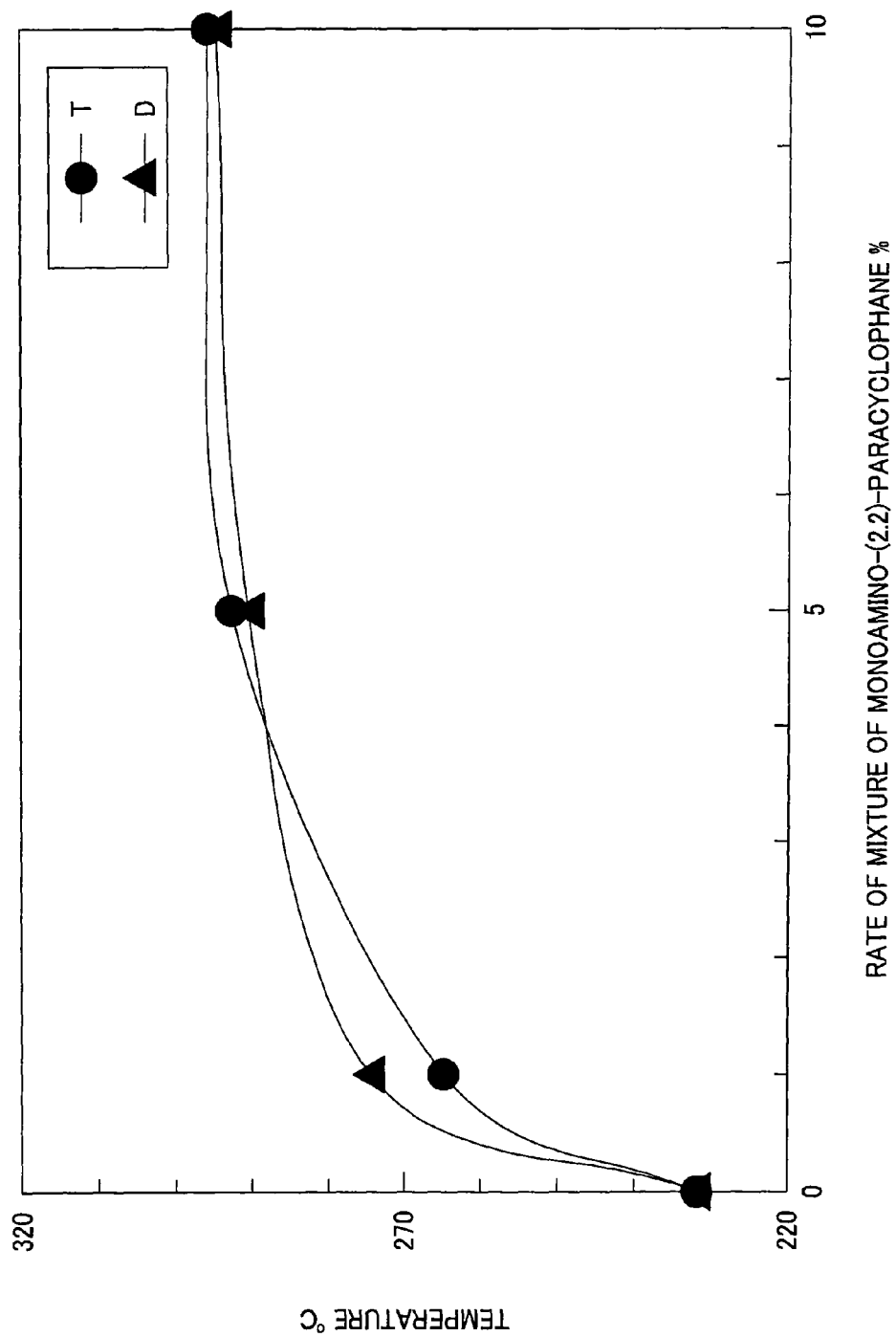
FIG. 2 is a graph showing a relation of the temperature of the point T and the point D and a rate of mixture of monoamino-(2.2)-paracyclophane in forming a film of dichloro-(2.2)-paracyclophane.

Table 2: effect of 5% mixture appearing when a state is observed in a heating furnace FIG. 2: relation between rate of mixture (%) and a point T and a point D (in the case of dichloro-(2.2)-paracyclophane)

TABLE 1

| Material | Index | Measured value (° C.) | Rise temperature (° C.) | Example No. |
|---|---|---|---|---|
| (2.2)-paracyclophane | T | 282.7 | 76.2 | 1 |
|  | D | 282.7 | 77.3 |  |
| dichloro-(2.2)-paracyclophane | T | 292.9 | 60.6 | 3 |
|  | D | 291.1 | 58.8 |  |
| tetrachloro-(2.2)-paracyclophane | T | 330.6 | 35.8 | 5 |
|  | D | 320.4 | 24.6 |  |

TABLE 2

| Material | Heating time | State | Note |
|---|---|---|---|
| (2.2)-paracyclophane | 10 minutes | Flexibility and tensile strength are lost. The film is crumbled to pieces by rubbing a little. | Comparative Example 1 |

TABLE 2-continued

| Material | Heating time | State | Note |
|---|---|---|---|
| dichloro-(2.2)-paracyclophane | 20 minutes | Flexibility and tensile strength are lost. The film is crumbled to pieces by rubbing a little. | Comparative Example 2 |
| tetrachloro-(2.2)-paracyclophane | 5 hours | Tensile strength is maintained to a certain degree, however, the film has no flexibility. The film is cut by folding it. There is no phenomenon that the film is crumbled to pieces by rubbing it. | Comparative Example 3 |
| dichloro-(2.2)-paracyclophane + 5% monoamino-(2.2)-paracyclophane | 5 hours | Flexibility and tensile strength are maintained. There is no phenomenon that the film is crumbled to pieces by rubbing it. | Example 3 |

From these results, the mixture of the amino-(2.2)-paracyclophane obviously gives an effect of improving the heat resistance of the polyparaxylylene and the derivative film thereof.

For instance, the point T and the point D of the film obtained by depositing the mixture of the dichloro-(2.2)-paracyclophane and the monoamino-(2.2)-paracyclophane of about 5% showed substantially the same values as those of a tetrachloroparaxylylene film evaluated as a heat resistance grade among the polyparaxylylene films. Further, in a heating test in the electric furnace, the former film exhibited the heat resistance more than the latter film. Further, the monoamino-(2.2)-paracyclophane is mixed with the tetrachloro-(2.2)-paracyclophane so that the heat resistance of the film can be more improved.

Further, the deposition program does not need to be changed and a usual program can be directly applied. Accordingly, processes or devices may not be changed. Further, since a quantity of use of the amino-(2.2)-paracyclophane is small, a problem does not arise in view of profitability.

EFFECTS OF THE INVENTION

As described above, according to the present invention, a method for improving the heat resistance of polyparaxylylene and a derivative film thereof and a polyparaxylylene derivative film whose heat resistance is improved can be provided without deteriorating deposition characteristics or profitability.

For instance, the point T and the point D of the film obtained by mixing the dichloro-(2.2)-paracyclophane and the monoamino-(2.2)-paracyclophane of about 5% (mass percentage) and depositing the mixture by the ordinary deposition program of the dichloro-(2.2)-paracyclophane showed substantially equal values as those of the tetrachloroparaxylylene film evaluated as a heat resistant grade among the polyparaxylylene films. Further, in the heating test in the electric furnace, the former film exhibited the heat resistance more than the latter film. Further, the monoamino-(2.2)-paracyclophane is mixed with the (2.2)-paracyclophane or the tetrachloro-(2.2)-paracyclophane and the mixture is deposited so that the heat resistance of the film can be more improved.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method for producing a heat-resistant polyparaxylylene derivative film, the method comprising mixing an amino-(2.2)-paracyclophane compound represented by general formula 3 and a (2.2)-paracyclophane compound represented by a general formula 2 when a polyparaxylylene film represented by general formula 1 is formed by chemical vapor deposition, wherein general formulas 1-3 are shown below:

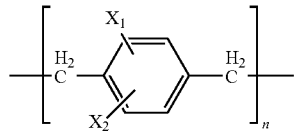

General Formula 1

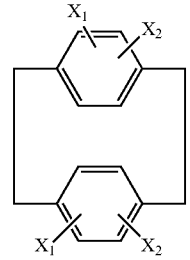

General formula 2 wherein $X_1$ and $X_2$ designate hydrogen, lower alkyl or halogen, $X_1$ and $X_2$ are the same or different, and n represents a degree of polymerization

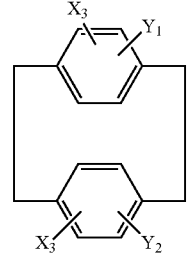

General formula 3 wherein $X_3$ designates hydrogen or a lower alkyl group, $Y_1$ and $Y_2$ designate hydrogen or an amino group and both $Y_1$ and $Y_2$ are not hydrogens at the same time.

2. The method according to claim 1, wherein the polyparaxylylene derivative film is a film of polyparaxylylene, where $X_1$ and $X_2$=hydrogen of general formula 1, polymonochloroparaxylylene, where $X_1$ is hydrogen and $X_2$ is chlorine of general formula 1 or polydichloroparaxylylene, where $X_1$ and $X_2$ are chlorine of general formula 1.

3. The method according to claim 2, wherein the amino-(2.2)-paracyclophane compound is a monoamino-(2.2)-paracyclophane, where $Y_1$ is hydrogen and $Y_2$ is the amino group of general formula 3 or a diamino-(2.2)-paracyclophane, where $Y_1$ and $Y_2$ are amino groups of general formula 3.

4. The method according to claim 1, wherein the amino-(2.2)-paracyclophane compound is a monoamino-(2.2)-paracyclophane, where $Y_1$ is hydrogen and $Y_2$ is the amino group of general formula 3 or a diamino-(2.2)-paracyclophane, where $Y_1$ and $Y_2$ are amino groups of general formula 3.

5. The method according to claim 1, wherein the amino-(2.2)-paracyclophane compound is used in an amount of about 0.5% to about 20% as a mass ratio of the material.

6. The method according to claim 1, wherein the amino-(2.2)-paracyclophane compound is used in an amount of about 1% to about 10% as a mass ratio of the material.

* * * * *